United States Patent
Warren et al.

[19]

[11] Patent Number: 5,892,362

[45] Date of Patent: Apr. 6, 1999

[54] METHOD AND APPARATUS FOR SPACIALLY CONTINUOUS TWO-DIMENSIONAL IMAGING OF SUBSURFACE CONDITIONS THROUGH SURFACE INDUCTION TECHNIQUES

[75] Inventors: Roy K. Warren, Houston, Tex.; Jesse G. Robison, 2814 Broadmoor Cir., Missouri City, Tex. 77459

[73] Assignee: Jesse G. Robison, Missouri City, Tex.

[21] Appl. No.: 856,879

[22] Filed: May 15, 1997

Related U.S. Application Data

[63] Continuation-in-part of Ser. No. 620,757, Mar. 18, 1996, Pat. No. 5,652,519, which is a continuation of Ser. No. 181,989, Jan. 13, 1994, abandoned.

[51] Int. Cl.⁶ ..................................................... G01N 3/10
[52] U.S. Cl. ............................................................. 324/339
[58] Field of Search ................................... 324/332, 333, 324/334, 335, 336, 337, 338, 339, 340, 341, 342, 345, 346, 357

[56] References Cited

U.S. PATENT DOCUMENTS

| | | | |
|---|---|---|---|
| 2,746,009 | 5/1956 | McLaughlin | 324/339 |
| 2,919,397 | 12/1959 | Morley | 324/334 |
| 3,317,821 | 5/1967 | Putton et al. | 324/346 |
| 3,391,334 | 7/1968 | Ruehle | 324/334 |
| 4,047,098 | 9/1977 | Duroux | 324/335 |
| 4,247,821 | 1/1981 | Buselli et al. | 324/336 |
| 4,290,020 | 9/1981 | Hansen et al. | 324/334 |
| 4,323,848 | 4/1982 | Kuckes | 324/338 |
| 4,502,010 | 2/1985 | Kuckes | 324/338 |
| 4,742,305 | 5/1988 | Stolarczyk | 324/334 |
| 4,748,415 | 5/1988 | Vail, III | 324/339 |
| 4,755,944 | 7/1988 | Glass | 364/422 |
| 4,849,699 | 7/1989 | Gill et al. | 324/339 |
| 4,901,023 | 2/1990 | Vail, III | 324/339 |
| 5,065,100 | 11/1991 | Vail, III | 324/339 |
| 5,208,539 | 5/1993 | Holmquist et al. | 324/334 |
| 5,260,661 | 11/1993 | Vail, III | 324/339 |
| 5,355,088 | 10/1994 | Howard, Jr. | 324/339 |
| 5,442,293 | 8/1995 | Lange | 324/332 |

*Primary Examiner*—Jay M. Patidar
*Attorney, Agent, or Firm*—Pravel, Hewitt & Kimball

[57] ABSTRACT

The present invention involves service induction techniques to produce two-dimensional spatially continuous imaging of subsurface conditions for interpreting and verifying three-dimensional, spatially continuous imaging of subsurface conditions or for planning a survey using three-dimensional, spatially continuous imaging. A transmitter coil is placed in the surface of the earth with the axis of the core perpendicular to the surface of the earth. A surface probe including a horizontal coil and a vertical coil is located along the surface of the earth at a fixed offset from the transmitter. Application of an alternating current to a transmitter coil generates a primary magnetic field adjacent to the transmitter. Should the lines of force in the primary magnetic field intercept an intervening layer or area of contrasting resistivity or conductivity, an electromagnetic force is produced within the area of contrasting resistivity causing the contrasting layer to generate a secondary magnetic field between the surface probe and the area of contrasting resistivity. Both the primary and secondary coils induce corresponding signals in the horizontal and vertical coils of the surface probe. The transmitter coil is placed in a multiplicity of positions on the surface of the area being investigated, with the induced signals being recorded for each transmitter coil location until the surface induction survey is completed. From the secondary induction signals, resistivity measurement is indicative of the resistivity of the contrasting layers of pollution within the survey area are computed. The resistives are then contoured, producing two dimensional displays of distributions of pollutants within the survey area. The survey induction techniques may be conducted along with vertical induction techniques in order to interpret and verify vertical induction data or may be conducted separately before vertical induction techniques in order to plan a vertical induction survey.

30 Claims, 4 Drawing Sheets

BRANCH A → ← BRANCH B

POLLUTION VOLUME: 22,500 FT³

METHOD AND APPARATUS FOR SPACIALLY CONTINUOUS TWO-DIMENSIONAL IMAGING OF SUBSURFACE CONDITIONS THROUGH SURFACE INDUCTION TECHNIQUES

CROSS-REFERENCE TO RELATED APPLICATIONS

The present application is a continuation-in-part of allowed prior U.S. patent application Ser. No. 08/620,757, filed Mar. 18, 1996, now U.S. Pat. No. 5,652,519, which is a continuation of U.S. patent application Ser. No. 08/181,989, filed Jan. 13, 1994, and now abandoned.

BACKGROUND OF THE INVENTION

1. Field of the Invention

The present invention relates to methods and apparatus for measuring pollutants contaminating earth formations, more particularly, two and three-dimensional mapping of the resistivity of near surface volumes of earth formations.

2. Description of the Related Art

The pollution of near-surface earth formations, is a problem drawing worldwide concern. Leaking underground gasoline, fuel oil and other hydrocarbons storage tanks are a major source of pollution of potable ground waters. Likewise, brine used in borehole drilling operations and stored in surface and underground storage containers is also a major ground water pollutant. Another source of pollution is natural saline water from deep formations which often migrates toward shallow potable ground water formations, the initial path of migration being around an oil and gas well casing which has not been properly cemented to obtain the desired zonal isolation.

The detection, quantification and monitoring of pollutants near the surface of the earth has historically been an expensive and time consuming operation. Traditional techniques involve the drilling of a multiplicity of shallow boreholes throughout an area of concern, retrieving core samples from the drilling operation, and analyzing the core samples for pollutants. These techniques have not detected polluted areas which have not been penetrated by a borehole. Another technique involves the drilling of a multiplicity of monitor wells throughout the area of concern. Sensors are temporarily or permanently placed at varying depths within the monitor wells, and various parameters indicative of the pollutants are measured as a function of time. In this way, either the boreholes penetrate the pollutants or the pollutants will migrate with time to the vicinity of one or more boreholes thereby being detected by the borehole sensors. This technique is particularly expensive and time consuming if detection requires the pollutants to migrate to the vicinity of the borehole before being detected. There is a high probability that discrete sampling techniques such as well bore core sampling or even monitor well measurements over time will not detect pollutants until they have contaminated an extensive volume of earth formation. At this point, remedial clean up is extremely costly and significant environmental damage has already occurred.

Pollutants such as hydrocarbons and brine usually exhibit significantly higher resistivity and lower resistivity, respectively, than more virgin earth formations. In detecting such pollutants, surface transmitters and well borehole receivers have been used for determining the resistivity of intervening earth formation. U.S. Pat. No. 2,746,009 to McLaughlin et al discloses a method directed to locating ore bodies. Main and vernier transmitter coils are set at one location at the surface and a receiver is conveyed along a nearby borehole. The receiver coil detects primary signal and any secondary signal resulting from a low resistivity ore body anomaly. The vernier coil is rotated about its axis giving measurements which are related to the direction of an ore body in a plane comprising the main transmitter, the vernier transmitter, the downhole receiver, and the ore body. Similarly, Ruehle discloses in U.S. Pat. No. 3,391,334 the use of a surface transmitter and well borehole receivers, in particular, three vertically spaced borehole receivers to measure resistivity of a layer of earth formation bounded by the vertical extent of the receiver array. A three-dimensional subterranean map of resistivity cannot be obtained using the methods disclosed by McLaughlin et al and Ruehle.

U.S. Pat. Nos. 4,323,848 and 4,502,010 to Kuckes are directed to a means of measuring the resistivity of earth formations using a surface transmitter and a downhole receiver comprising a magnetometer. The thrust of both inventions is directed to improvements of the magnetometer receiver. Two embodiments of the surface transmitter are disclosed. The first embodiment comprises a circular antenna concentric with the top of the wellbore with the axis of the loop being perpendicular to the plane of the surface of the earth. The second embodiment comprises two electrodes inserted into the earth surface on opposite sides of the top of the borehole. In both embodiments, the transmitter remains fixed with respect to the position of the borehole. Therefore, spatially continuous, three-dimensional measurements of resistivity cannot be obtained using the means or methods taught by Kuckes.

U.S. Pat. Nos. 4,748,415; 4,901,023; 5,065,100; and 5,260,661 to Vail, III are directed toward measuring the resistivity of earth formation from within a borehole cased with highly conducting material such as steel. Surface transmitters are employed as well as downhole receivers. In one embodiment, two surface transmitters comprising circular antennas are used with the first being concentric with the top of the borehole and the second being positioned remote from the borehole with the axis being perpendicular to the plane of the earth's surface. The transmitters remain fixed with respect to the position of the borehole. Spatially continuous measurements, however, are not obtainable using the disclosures of Vail III.

A method of generating a spatially continuous, three-dimensional map of near-surface volumes of earth formation for detecting pollutants is that in a commonly owned U.S. Pat. No. 5,652,519, granted on Jul. 29, 1997. The surveying method disclosed in that patent application is directed to vertical induction mapping with measurements obtained in a borehole. A vertical induction survey requires one or more drill holes to be placed in or around the area to be surveyed. After a vertical induction survey is taken, the data collected is used in generating a vertical induction map to study and locate possible pollutant areas. The vertical induction data, however, was not susceptible to being independently verified with this technique. In addition, several boreholes might be made during a vertical induction survey in order to locate a borehole position suitably close to anomalous areas. However, the locations of the anomalies were unknown before vertical induction logs were taken.

BRIEF SUMMARY OF THE INVENTION

The present invention uses surface induction techniques to produce two-dimensional, spatially continuous imaging of subsurface conditions for interpreting and verifying three-dimensional, spatially continuous imaging of subsurface conditions or for planning a survey using three-dimensional, spatially continuous imaging. A transmitter coil is placed on the surface of the earth with the axis of the coil perpendicular to the surface of the earth. A surface probe including a horizontal coil and a vertical coil is located along the surface of the earth at a fixed offset from the transmitter. Application of an alternating current to the transmitter coil generates a primary magnetic field adjacent to the transmitter. Should the lines of force of the primary magnetic field intercept an intervening layer or area of contrasting resistivity or conductivity, an electromagnetic force is produced within the area of contrasting resistivity causing the contrasting layer to generate a secondary magnetic field between the surface probe and the area of contrasting resistivity. Both the primary and secondary fields induce corresponding signals in the horizontal and vertical coils of the surface probe. The transmitter coil is placed in a multiplicity of positions on the surface of the area being investigated, with the induced signals being recorded for each transmitter coil location until the surface induction survey is completed.

From the secondary induction signals, resistivity measurements indicative of the resistivity of the contrasting layers of pollution within the survey area are computed. The resistives are then contoured, producing two dimensional displays of distributions of pollutants within the survey area. The surface induction techniques may be conducted along with vertical induction techniques in order to interpret and verify vertical induction data or may be conducted separately before vertical induction techniques in order to plan a vertical induction survey.

BRIEF DESCRIPTION OF THE DRAWINGS

The present invention may be more readily described and understood by reference to the accompanying drawings in which.

DETAILED DESCRIPTION OF THE PREFERRED EMBODIMENT

Figure 1:
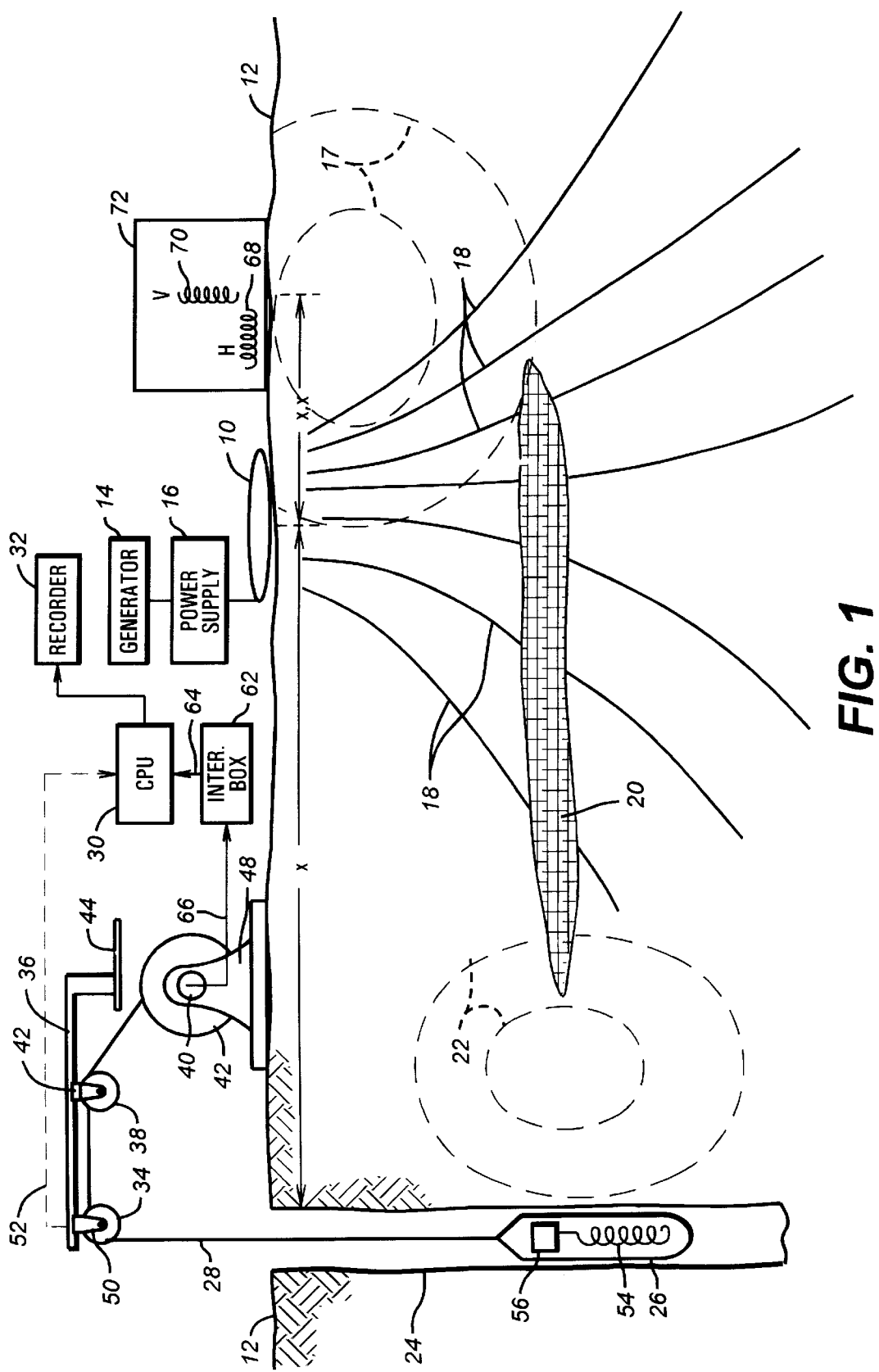
FIG. 1 is a diagram of the induction measurement site of the present invention for collecting surface induction data and vertical induction data.

Turning now to the drawings, FIG. 1 is a diagram of the induction measurement site of the present invention for collecting vertical induction data and surface induction data. An essentially circular transmitter coil 10, preferably having a diameter of five feet and comprising 36 turns of 12 gauge wire, is positioned on the surface 12 of the earth with the axis of the coil 10 being perpendicular to the plane of the surface 12 of the earth. The generator 14, preferably having an output of at least 6.5 kW, supplies power to a power supply 16 of the type manufactured by Elgar or the equivalent. The power supply 16 is preferably set at a frequency of 455±10 Hz but can be varied to values as low as 263±10 Hz. The frequency employed is dependent upon the desired horizontal range and frequency resolution for the survey being performed, but the preferred frequency of operation is about 455 Hz. The power supply 16 regulates power from the generator 14. The output of power supply 16 is electrically connected to the transmitter coil 10. The output parameters for the transmitter coil 10 are preferably within the range of 2.0 to 4.0 amperes at approximately 45 volts.

The alternating current within the transmitter coil 10 induces a primary magnetic field, with associated lines of force 18, which radiate out from the transmitter coil 10 into the adjacent earth formations. Should the force field 18 encounter a region of contrasting electrical resistivity, such as the region depicted by numeral 20 in FIG. 1, eddy currents will be induced in the region of contrast 20 according to Faraday's law. These eddy currents, having a frequency of the power applied to transmitter coil 10, generate a secondary magnetic field with associated lines of force 22 which oppose the primary force field 18 and a secondary magnetic field with associated lines of force 17 which also oppose the primary field 18.

FIG. 1 also depicts a borehole 24 in the general vicinity of the location of transmitter coil 10. A fluid tight vertical induction probe 26 made of non-conducting material such as PVC, transite, Lucite, or the like is attached to a cable 28 which includes one or more electrical conductors. The cable 28 serves as a means of raising and lowering the probe 26 in borehole 24 as well as a path of electrical communication between the probe 26 and the data processing equipment 30 and data recording equipment 32 located at the surface 12 of the earth. The cable 28 is passed over the first sheave wheel 34 which is attached to a boom 36, and then passed over a second sheave wheel 38 and then guided on to drum 40. The second sheave wheel 38 is attached to a level-wind track 42 with the level-wind track 42 being attached to boom 36. Boom 36 is fixed to horizontal structure 44, the structure being fixed with respect to the location of borehole 24. A drum 46 rotates about its axis on mounts 48 which are likewise fixed with respect to the position of borehole 24. The probe 26 is raised and lowered in the borehole 24 by rotating drum 46 with a suitable motor drive unit (not shown). The second sheave wheel 38 being mounted on level-wind track 42 assures that the retrieved cable 28 is laid on the drum 40 in orderly layers as the probe 26 is pulled from the borehole 24. The first sheave wheel 34 cooperates with a depth indication unit 50 thereby sending signals by way of path 52 to the data processing equipment or CPU 30 wherein the depth of the vertical induction probe 26 within the borehole 24 is tracked.

The vertical induction probe 26 contains a receiver coil 54 tuned to the same frequency as the transmitter 10 with the axis of the coil 54 parallel to the axis of the probe 26. The primary field represented by force lines 18 induces voltage signals within the receiver coil 54. If a region of contrasting resistivity 20 is present within the survey area, the lines of force 22 resulting from eddy currents induce a secondary voltage signal within the receiver coil 54. The composite induced voltage, comprising the sum of primary and any secondary voltages, are amplified within the probe instrument section 56 to which the receiver coil 54 is electrically connected. The instrument section 56 also includes a cable driver circuit which transmits the amplified composite signals to the surface over the cable 28. The signals are transmitted from the terminus of the cable 28 through slip-ring connectors 58 mounted near the axis of rotation of cable drum 46. The measured signals then pass from the slip rings 58 through electrical path 60 to an interface box 62. The frequency and amplitude of the signals are further adjusted with the circuitry within the interface box 60. The interface box 60 also provides grounding for the system. The measured signals are then passed from interface box 62 to a CPU 30 by way of electrical path 64. The CPU 30 tracks the composite induced voltage signals from receiver coil 54 along with the corresponding depth indications from depth indication unit 50 and records the data with a suitable recording means 32. The CPU 30 and recording means 32 may be combined into a single unit such as a personal computer with sufficient data storage space like computers of the type manufactured by IBM.

A second embodiment of the present invention comprises a vertical induction probe 26 which contains two receiver coils (not shown) axially mounted within the probe 26. The coils are spaced approximately two feet apart, with each coil having essentially the same number of windings and the same physical dimensions. The windings of the two coils are, however, in opposite directions. Any voltage induced within the coils of opposite polarity. The outputs of induced voltages from the coils are summed. Because the primary field 18 has a relatively long wave length in that it is slowly varying with depth z, the summing of outputs from the two coils tends to cancel the primary signal. On the other hand, the secondary signal exhibits a shorter wavelength in that it varies in magnitude relatively rapidly as a function of z. The dual receiver coil enhances the measured secondary signal with respect to the primary signal.

The probe 26 is drawn or "logged" from the borehole 24 at a preferred rate of 10 feet per minute with readings of the induced voltage in receiver coil 54 being made and processed at preferably 0.1 foot depth intervals. Once the logging of the borehole 24 is completed, the data is processed such that the primary induced voltage signal is removed leaving a measurement of secondary induced voltage as a function of depth. These induced voltages measured by vertical induction probe 26 constitute the vertical induction measurements of the present invention. Thus, probe 26 serves as a vertical induction receiver.

In addition to a vertical induction survey for collecting vertical induction data, the present invention allows for conducting a surface induction survey along with a vertical induction survey. When the transmitter 10 is turned on for a measurement, one or more surface induction measurements may be taken. The surface induction measurements are made with a constant offset distance from the transmitter 10, usually about 25 feet. The surface induction receiver includes a horizontal coil 68 pointed at the transmitter 10 and a vertical coil 70 perpendicular to the horizontal coil 68. The vertical coil 70 is preferably attached to the horizontal coil 68 within a non-metallic housing that serves as the surface induction receiver 72. These coils are tuned to the same frequency as the transmitter 10 and the vertical induction receiver 26. The vertical coil 70 of the surface induction receiver 72 measures the primary electromagnetic field 18 from the transmitter 10. The horizontal coil 68 of the surface induction receiver 72 measures a secondary electromagnetic field 17 generated by the current flow induced by features at or below the earth's surface. While a surface induction receiver 72 operates above the earth's surface, unlike a vertical induction receiver 26 which operates below the earth's surface, a surface induction receiver 72 provides suitable preliminary measurements in detecting near-surface pollution.

Surface induction data includes a raw induction measurement with each vertical induction measurement composed of a XX coordinate, the constant offset from the transmitter, and an X coordinate representing the distance between the transmitter and the borehole 24. So that each vertical induction measurement may have a value that is relative to the same baseline value, the surface induction data is reduced to units of resistivity. Preferably this is done by obtaining a measure of the ratio of voltages or electromagnetic fields measured by the vertical coil 70 in relation to those of horizontal coil 68. From these relative resistivity values, a two-dimensional map is produced of variations in these values over the earth surface. The two-dimensional surface induction map is compared with the three-dimensional vertical induction map. The comparison is made between the surface map and depth slices, or vertical induction measures obtained at a succession of borehole depths. When the two-dimensional surface induction map matches one or more depth slices from the three-dimensional vertical induction map, the vertical induction data is considered quality checked or confirmed. Thus, the surface induction map serves as an independent means for verifying the vertical induction data.

A surface induction survey also serves to generate background values for a vertical induction survey. Vertical induction relativity values must be interpreted in terms of background values in order to determine which values correspond to anomalous resistivities. In addition, a surface induction survey may be used as a guide for planning a vertical induction survey. This is done by taking a number of surface induction readings in the area of interest in advance of drilling the borehole 24. Based on the preliminary surface induction measurements, location of the borehole 24 at a site most likely to be near an area of potential electromagnetic anomalies can be made. In this way, surface readings can be used as a planning guide for the more time consuming and more expensive vertical profiling. In this way, a reconnaissance surface induction survey helps to determine possible areas of interest or concern before drilling holes in or around a survey area as is required for a vertical induction survey. After the borehole is drilled, both surface and vertical induction measurements are made for analysis.

Figure 2:
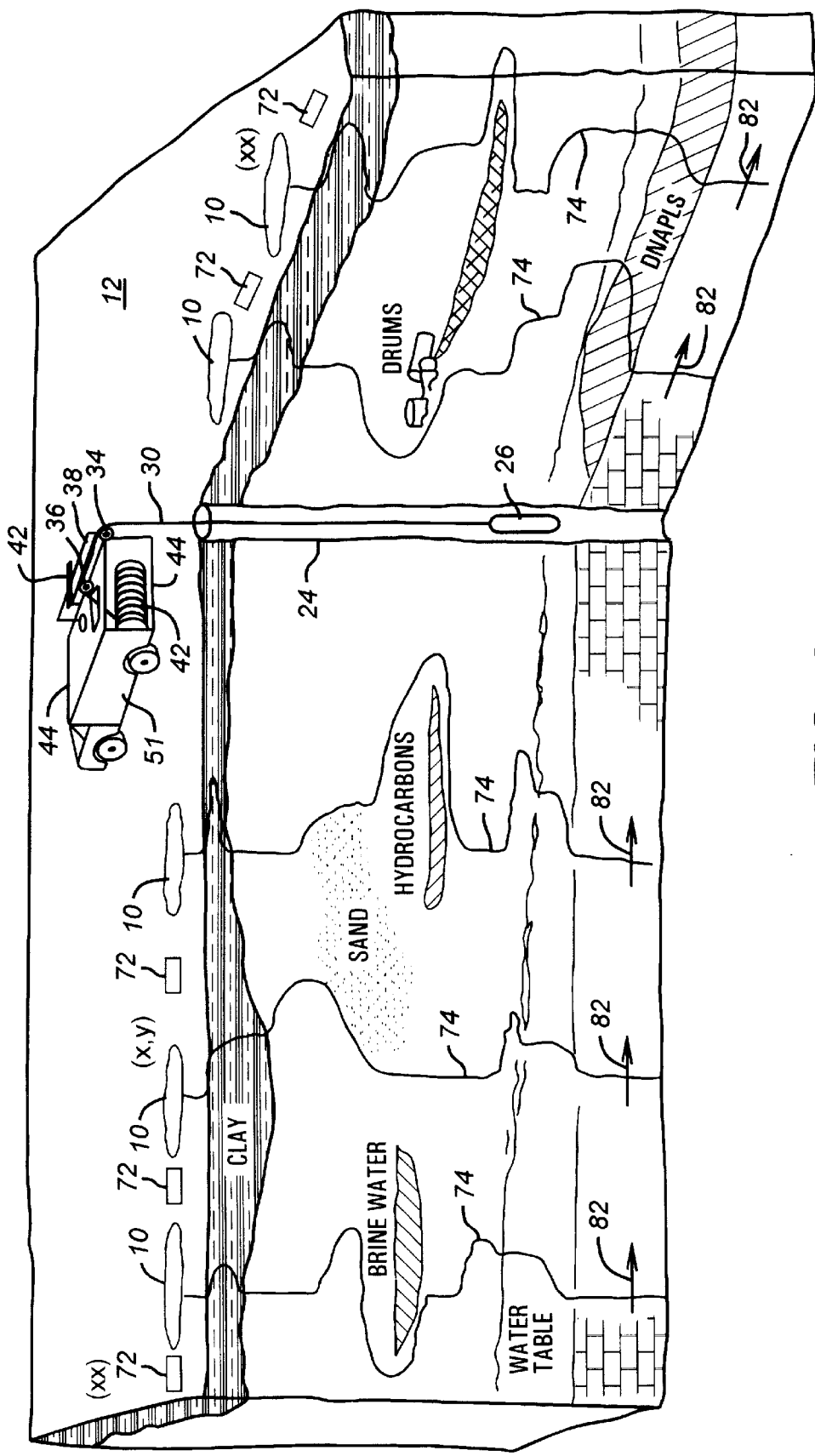
FIG. 2 is a diagram illustrating the invention applied to the area being surveyed, with representative measurements also being illustrated in sub regions which contain pollutants and in sub regions which do not contain pollutants.

FIG. 2 illustrates a typical arrangement for a survey of an area using the present invention. In the preferred embodiment, the draw-works, CPU 30 and data recording means 32 are contained within the vehicle 51 for mobility. Upon completion of each logging pass within the borehole 24, the transmitter coil 10 is positioned at a new location on the earth surface 12 and the borehole logging process is repeated. The process is continually repeated until the degree of coverage of the survey area is obtained.

FIG. 2 also depicts a volume of earth formation in cross section wherein areas containing brine water, hydrocarbon, leaking metal drums, and DNAPLS are present. Five positions of transmitter coil 10 and surface induction receiver 72 are illustrated with corresponding pseudo resistivity logs 74 shown for each transmitter coil location. Arrows 82 indicate the direction of increasing resistivity of the pseudo resistivity logs 74. The coordinates (x,y) define the multiple locations of transmitter coil 10. The coordinate (xx) defines the multiple locations of the surface reduction receiver 72 which is a fixed offset from transmitter 10.

Generation of Pseudo Resistivity Logs

Figure 3A:
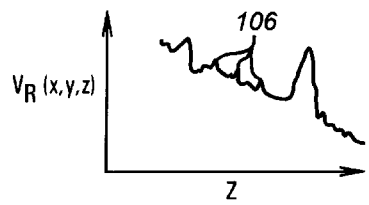
FIGS. 3A–3G are diagrams graphically depicting the steps employed in processing raw voltages measured in the vertical induction receiver as a function of depth within the borehole and measured in the surface induction receiver, to eventually obtain a log of secondary resistivity.
Figure 3B:
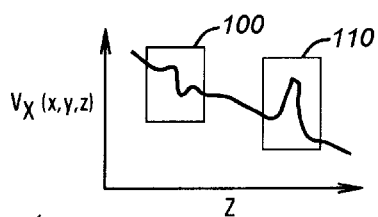

The induced voltages measured by the vertical induction probe 26 are processed to generate a log of resistivity as a function of depth within the borehole. The log is referred to as a "pseudo resistivity log," using the terminology of the petroleum industry. $V_R(x,y,z)$ is defined as the raw voltage measured at the receiver coil 54 with the vertical induction probe 26 at a depth z within the borehole and the transmitter coil 10 at a position (x,y) on the surface of the earth. $V_X(x,y,z)$ plotted as a function of z is shown in FIG. 3*a*. The raw data $V_R(x,y,z)$ may contain spurious, high frequency noise 106 which is neither induced by system hardware or may be environmental in nature. Such noise, if present, is removed by filtering of the raw data yielding $$V_X(x,y,z)=F[V_R(x,y,z)] \qquad (1)$$

where F is a suitable smoothing filter function in z to remove any high frequency noise component. The result of the removal of noise is illustrated in FIG. 3*b* as a plot of $V_X(x,y,z)$ based upon the magnitude of the higher frequency secondary signal with respect to the lower frequency primary signal. If the secondary signal is relatively small with respect to the primary signal, as illustrated in the region designated by the numeral 100 in FIG. 3*b*, processing designated as branch A is applied. If the secondary signal dominates the measured response, as is illustrated in the region designated by the numeral 110 in FIG. 3*b*, processing designated as branch B is followed.

In Branch A processing, a fourth point filter in z, which corresponds to a 4 foot filter for the preferred sample rate of 10 points per foot, is applied to $V_x(x,y,z)$ yielding $$V_{X,P}(x,y,z) = \left[ \sum_{z-20}^{z+20} V_X(x,y,z) \right] / 40 \qquad (2)$$

Figure 3C:
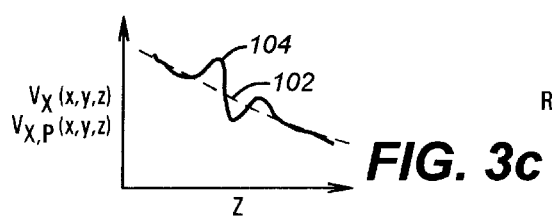
Figure 3F:
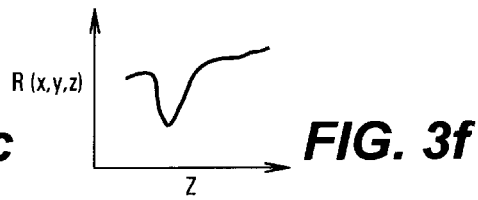
Figure 3D:
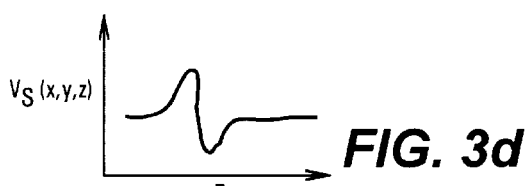
Figure 3E:
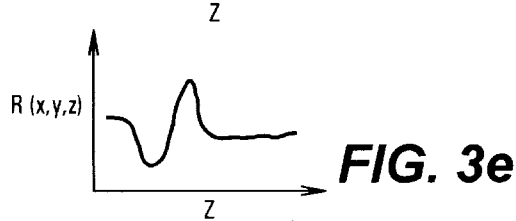

$V_{X,P}(x,y,z)$ is treated as the primary signal and is illustrated in FIG. 3*c* by the numeral 102 along with $V_X(x,y,z)$ denoted by the numeral 104. The secondary signal, $V_S(x,y,z)$, is computed from the relationship $$V_S(x,y,z)=V_X(x,y,z)/V_{X,P}(x,y,z) \qquad (3)$$

and is plotted as a function of z in FIG. 3*d*. The slowly varying component in z or the long wave length component of the measured induced voltage is due to unpolluted "background" regions of the survey area. Rapidly varying components in z or short wave length components are due to relatively confined areas of contrasting resistivity, namely areas of pollution. $V_X(x,y,z)$ is denoted by the numeral 104. $V_S(x,y,z)$ is still in units of millivolts induced by the fields in the receiver coil 54. It is necessary to convert this parameter to equivalent resistivity in order to generate the desired pseudo resistivity log. The conversion is accomplished by using a transform having the form $$R(x,y,z)=R_A[(1-V_S(x,y,z))/1+V_S(x,y,z))] \qquad (4)$$

where R(x,y,z) is the secondary signal in resistivity units of ohm-meters and $R_A$ is the average resistivity of the survey area, also in units of ohm-meters. R(x,y,z) as a function of z is illustrated in FIG. 3*e*. Following this transformation, the measured secondary resistivity signal is now in units which can be compared and combined with other information for correlation purposes such as conventional resistivity logs. Furthermore, a secondary signal in units of resistivity can be related to the types of anomalies. As examples, high and low resistivity anomalies might suggest that the pollutants are hydrocarbons and brines, respectively.

Figure 3G:
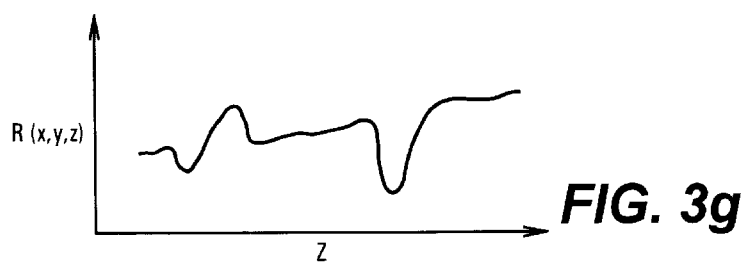

Turning now to Branch B of the data processing, it is assumed that the measured voltage $V_X(x,y,z)$ is predominately composed of a response to the secondary signal. In this case, R(x,y,z) is computed from the relation $$R(x,y,z)=R_A[(1-V_X(x,y,z))/(1+V_X(x,y,z))] \qquad (5)$$

where, again $R_A$ is the average resistivity of the survey area. This step is illustrated as R(x,y,z) plotted as a function of z in FIG. 3*f*. The final step in the processing is the combining of the processing results of branches A and B to form a pseudo resistivity log over the entire logged borehole as illustrated in FIG. 3*g*. It is noted that any error in the estimated value of $R_A$ will result in an offset of the pseudo resistivity log, the algebraic sign and magnitude of the offset being proportional to the algebraic sign and magnitude of the estimated error. This is not critical in the determination of possible regions of pollution since resistivity contrast, rather than absolute resistivity magnitude, is the primary criterion.

It is noted that the conversion of data from millivolts to resistivity in units of ohm-meters can be accomplished at any point in the data processing scheme. The point at which the conversion is made is not critical to the present invention. As an example, data measured in millivolts could be converted to resistivity values prior to the noise filtering step as illustrated in FIG. 3*a*, after noise filtering, or at virtually any point in the sequential data processing chain without adverse effects. Areas of contrasting resistivity may be mapped without converting the measured induced voltages to equivalent resistivity. However, interpretation of the results, such as the identification of the type of pollutant, is aided by conversion to resistivity. Accordingly, the preferred embodiment, employs the conversion of measured data in millivolts to resistivity as detailed above.

Surface induction measurements, however, do not vary as a function of depth and therefore would not be depicted as a function of z or require normalization as used in processing vertical induction measurements. The generation of pseudo resistivity logs described above and depicted in FIGS. 3*a*–3*g* equally apply to measurements taken by a surface induction receiver 72. The values obtained in the vertical induction profile must be interpreted in terms of the background values in order to locate truly anomalous readings. The readings obtained independently with the surface induction profile are helpful for this purpose.

Interpreting surface reduction measurements may involve the filtering and other processing as described above in the context of vertical induction measurements. The raw voltage measured by a surface induction receiver 72 may be represented by $S_R(x,y,xx)$. The coordinates (x,y) as with the vertical induction receiver define the position of the transmitter 10 on the surface of the earth. The coordinate xx defines the offset distance between the location of the transmitter 10 and the surface induction receiver 72. The offset distance is constant, usually about twenty five feet. Surface induction measurements like vertical induction measurements are used to generate a pseudo resistivity log for each transmitter location. At this point in the data processing, a pseudo resistivity log has been generated for the transmitter coil 10 located at coordinates (x,y) on the earth surface. The transmitter coil 10 is move to a multiplicity of positions (x,y) over the survey area, the borehole 24 is relogged for each transmitter coil position, and corresponding pseudo resistivity logs are generated using the previously described procedures.

The results of the vertical induction survey process is a set of pseudo resistivity logs of secondary signals over the entire survey area, with z=0 corresponding to the top of the borehole. It should be realized, however, that the topography of the survey area might not be level. Stated another way, the elevation of each transmitter coil location might, and usually does, vary with respect to the top of the borehole 24. It is necessary, therefore, to normalize all vertical induction pseudo resistivity logs to a reference elevation $z_r$ which, for example, might be the average elevation of all transmitter coil locations, or might be the elevation of the top of the borehole. For either choice of $z_r$, it is necessary to shift or normalize each vertical induction pseudo resistivity log to a common reference elevation before three-dimensional processing and display of the area survey data. It might also be necessary to shift the pseudo resistivity log data in a non-linear manner should, for example, the cable 28 stretch inelastically during the sequential logging of the borehole 24 for each transmitter coil position. Upon completion of any necessary shifting of the set of vertical induction pseudo resistivity log data, the data set is then ready for three-dimensional processing, mapping and display.

Geometric Limits

Transmitter coil-receiver coil distances are usually within the range of 20 feet to 300 feet. The geometry of the transmitter 10 and receiver coil 54 comprises two vertical dipoles separated by a distance sufficiently great to insure coplanar configuration. Once the transmitter coil-receiver coil distance is less than about two times the depth of the probe 26, large spurious artifacts are seen in the raw data which cannot be removed by post processing. It is essential, therefore, that the survey be made within the geometric limits of the invention in order that meaningful data be measured and processed.

Graphic Display of the Set of Pseudo Resistivity Log Data

Figure 4:
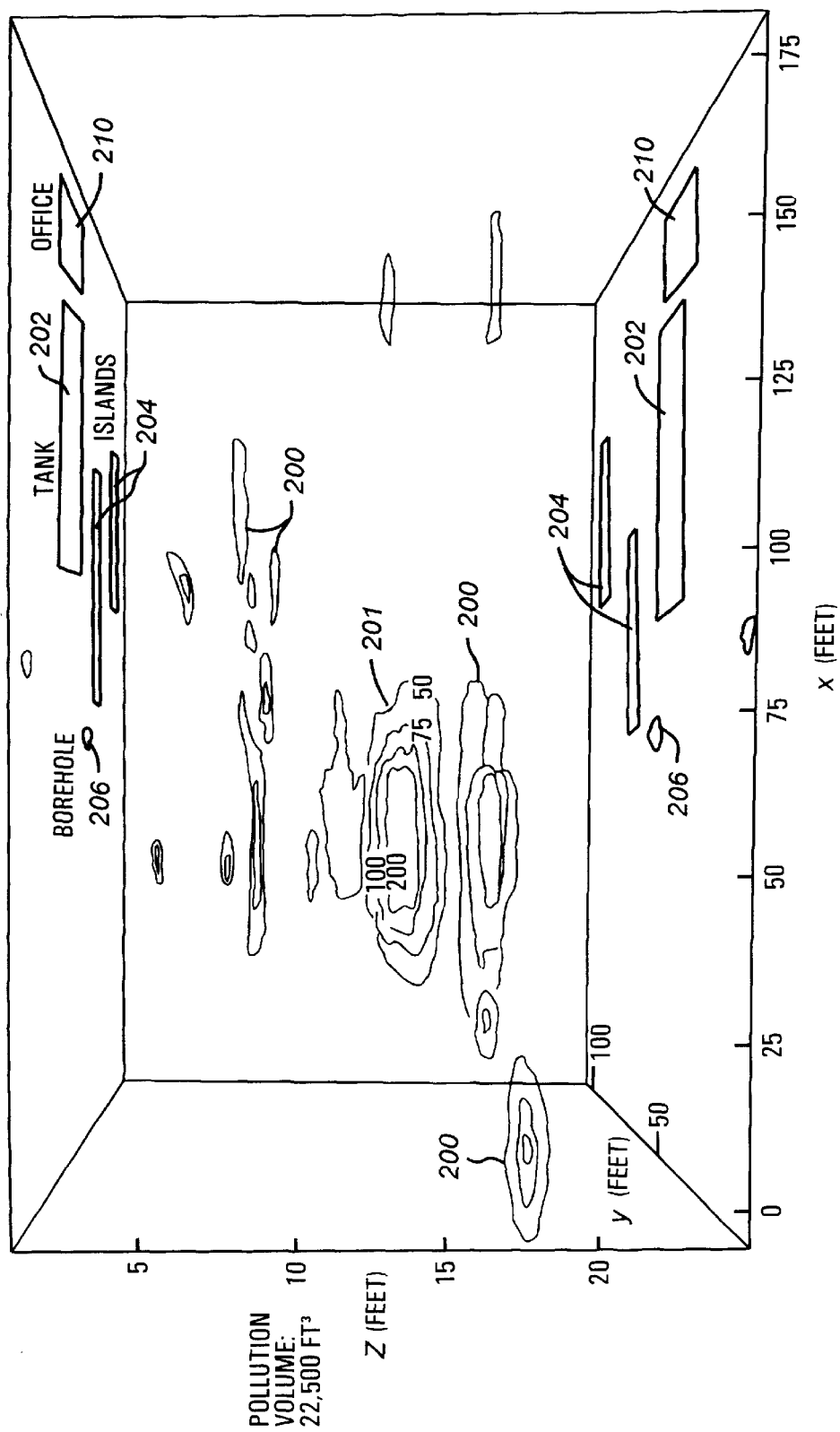
FIG. 4 is a three-dimensional diagram of regions of contrasting resistivity within the survey area, with these contrasting resistives being related to the location and magnitude of pollutants within the survey area.

The multiple resistivity logs generated from the vertical induction measurements comprise a three-dimensional set of secondary resistives, R(x,y,z), measured within the survey site. This data is used as input for a three-dimensional geo-visualization and processing software package such as one offered by Dynamic Graphics, Inc. A three-dimensional map of resistivity of the survey area is created from vertical induction measurements. An example of such a map or contour is shown in FIG. 4. This particular survey was made at a gasoline service station. Images of key structures are shown in the x-y plane such as pump islands 204, borehole 206, an underground storage tank 202, and the station office 210. three-dimensional contours of 25, 50, 75, 100, and 200 ohm-meters are illustrated as an example in high resistivity area 201. Other highly resistive fluids and materials form a rather complex system of resistivity anomalies, identified by the numeral 100. Hydrocarbon fluids appear to be leaking from the underground storage tank 202 as well as from the pump islands 204. To verify a depth slice of the vertical induction map, a depth slice may be compared to a two-dimensional surface induction map generated from surface induction measurements.

Volumetrics can also be calculated from the resistivity contours. In the survey example depicted in FIG. 4, approximately 22,500 cubic feet of survey area contain measurable pollutants within the total survey volume of 437,500 cubic feet. The pollutant volume computation feature of the present invention is important in that the degree of pollution may be determined and the required remedial actions may be based upon these volumetric computations.

Having described the invention above, various modifications of the techniques, procedures, material and equipment will be apparent to those in the art. It is intended that all such variations within the scope and spirit of the appended claims be embraced thereby.

We claim:

1. A method of measuring for pollutants contaminating subsurface earth formations located in an area of interest as indicated by regions of contrasting resistivity of the subsurface earth formations indicated in data obtained by making spatially continuous measurements of electrical properties of the earth formations, comprising the steps of:

(a) positioning an electromagnetic transmitter at multiple spaced locations on the surface of the earth above the area of interest, and for each transmitter location performing the steps of:

(1) applying an alternating current to said transmitter, thereby inducing a primary magnetic field within the earth in the area of interest;

(2) generating a first secondary magnetic field and a second secondary magnetic field through the interaction of said primary field with any regions of contrasting electrical properties within the earth in the area of interest;

(3) conveying a first probe along a borehole located in the area of interest spaced from said transmitter locations, said first probe containing at least one receiver in which voltage is induced by said primary and said first secondary magnetic fields;

(4) measuring with said first probe receiver the composite of said primary and said first secondary magnetic fields as a function of depth in said borehole;

(5) determining the values of said first secondary magnetic field as a function of depth within said borehole from said composite of said primary and said first secondary magnetic fields measured by said first probe;

(6) providing a second probe along the surface of the earth at a constant offset distance from said transmitter location, said second probe comprising a vertical coil perpendicular to the surface of the earth and horizontal coil parallel to the surface of the earth;

(7) measuring with said vertical coil of said second probe said primary magnetic field;

(8) measuring with said horizontal coil of said second probe said second secondary magnetic field;

(b) computing from said first secondary magnetic field values measured by said first probe and determined as a function of depth for each transmitter location a spatially continuous, three-dimensional map indicative of said regions of contrasting resistivity in the area of interest;

(c) generating a spatially continuous, three-dimensional map indicative of said electrical resistivity properties of said earth formation in the area of interest;

(d) computing from said second secondary magnetic field values measured by said horizontal coil of said second probe a spatially continuous, two-dimensional map indicative of said regions of contrasting resistivity in the area of interest; and (e) generating a spatially continuous, two-dimensional map indicative of said electrical resistivity properties of said earth formation in the area of interest for interpreting and verifying said spatially continuous, three-dimensional map.

2. The method of claim 1, wherein the values of said first secondary magnetic field measured by said first probe and said corresponding values of resistivity are determined subsequent to the measurement of said primary and first secondary fields as a function of depth in said borehole for said transmitter coil locations on the surface.

3. The method of claim 2, wherein said first secondary magnetic field values measured by said first probe, determined as a function of depth, are normalized to a reference depth prior to said step of generating said spatially continuous, three-dimensional map.

4. An apparatus for measuring for pollutants contaminating earth formations as indicated by regions of contrasting resistivity of subsurface earth formations located in an area of interest indicated in data obtained by making spatially continuous measurements of electrical resistivity properties of the earth formations, comprising:

(a) a transmitter adapted to be positioned at multiple locations on the surface of the earth in the vicinity of a borehole located in the area of interest, said transmitter inducing magnetic fields within the earth in the area of interest;

(b) means for powering said transmitter;

(c) an elongated first probe comprising at least one receiver for measuring magnetic field data in the area of interest;

(d) means for conveying said first probe along said borehole through the formations in the area of interest;

(e) a second probe comprising a vertical coil and a horizontal coil for measuring magnetic field data in the area of interest;

(f) means for providing said second probe along the surface of the earth;

(g) means for providing power to said first probe and said second probe;

(h) means for measuring the depth of said first probe within said borehole;

(i) means for transmitting magnetic field data measured by said probe to the surface of the earth;

(j) means for transmitting magnetic field data measured by said second probe;

(k) means for processing magnetic field data measured by said first probe and said second probe to obtain, interpret, and verify a measure of electrical properties of earth formation in the area of interest of said processing means comprising:

means for correlating said magnetic field data measured by said first probe with said measures of depth of the probe at which said magnetic field data are measured;

means for separating from magnetic field data measured by said first probe and said second probe the contribution due to secondary magnetic fields induced by said transmitter due to contrasting resistivity caused by pollutants;

(l) means for generating a spatially continuous, three-dimensional map of the secondary magnetic field portion of said magnetic field data in the area received by said first probe of interest due to contrasting resistivity, thus indicating locations of contaminating pollutants; and (m) means for generating a spatially, continuous, two-dimensional map of the secondary magnetic field portion of the magnetic field data measured by said second probe in the area of interest due to contrasting resistivity, for interpreting and verifying the locations of contaminating pollutants indicated by said spatially continuous, three-dimensional map.

5. The apparatus of claim 4, wherein said means of conveying said first probe along said borehole comprises a cable with the first end of said cable being attached to said first probe and a second end attached to a cable draw works located at the surface of the earth.

6. The apparatus of claim 5, wherein said cable contains at least one electrical conductor, with said first end of the cable being electrically and mechanically connected to said first probe and said second end of the cable being mechanically connected to said surface processing means through slip rings in the winch of said cable draw works.

7. The apparatus of claim 6, comprising means for providing power to said first and second probes wherein the source of power is located at the surface of the earth and said power is provided to said first probe by way of one or more said electrical conductors contained within said cable.

8. The apparatus of claim 7, further comprising means of transmitting to the surface of the earth signals measured by said first probe wherein said signals are transmitted through one or more conductors within said cable.

9. The apparatus of claim 8, wherein said processing means provides the functions of correlating said signals measured by said first probe with said measures of depth of the first probe at which said signals are measured.

10. The apparatus of claim 9, wherein said processing means provides the function of separating from said measured signals the contribution due to secondary magnetic fields induced by said transmitter.

11. The apparatus of claim 10, further comprising means for providing spatially continuous maps of the portion of said measured signals due to secondary fields and means for providing spatially continuous maps of parameters related to said signals due to secondary fields.

12. The apparatus of claim 4, wherein said transmitter induces a magnetic field within the subsurface earth formations between said surface transmitter location and said first probe in the borehole at each of said multiple spaced transmitter locations.

13. The apparatus of claim 4, wherein said transmitter induces a secondary magnetic field within the subsurface earth formation between said second probe and the regions of contrasting relativity.

14. A method of measuring for pollutants contaminating earth formations as indicated by regions of contrasting resistivity of subsurface earth formations in an area of interest indicated in data obtained by making spatially continuous measurements of the resistivity of the earth formations the steps of:

(a) positioning an essentially circular transmitter coil at multiple spaced locations on the surface of the earth, the axis of said transmitter coil being essentially normal to the plane of the earth surface, and for each transmitter coil location;

(1) applying an alternating current to said transmitter thereby inducing a primary magnetic field within the earth in the area of interest beneath said transmitter coil;

(2) generating a first and second secondary magnetic field through interaction of said primary field with any regions of contrasting resistivity indicative of contaminating pollutants within the earth in the area of interest beneath said transmitter coil;

(3) employing a cable and draw works to convey a first probe along a borehole where said borehole is located in the area of interest, spaced from said transmitter coil locations, said first probe containing at least one receiver in which voltage is induced by said primary and said first secondary magnetic fields;

(4) providing a second probe along the surface of the earth at a constant offset distance from said transmitter location, said second probe comprising a vertical coil perpendicular to the surface of the earth and a horizontal coil parallel to the surface of the earth;

(5) measuring with the first probe receiver the composite strength of said primary and said first secondary magnetic fields as a function of depth in said borehole;

(6) determining the values of said first secondary magnetic field as a function of depth within said borehole from said composite of said primary and said first secondary magnetic fields measured by said first probe;
(7) measuring with said vertical coil of said second pulse said primary magnetic field;
(8) measuring with said horizontal coil of said second probe said second secondary magnetic field;

(b) computing from said first secondary magnetic field values measured by said first probe and determined as a function of depth for each transmitter coil location a spatially continuous, three-dimensional map indicative of said regions of contrasting resistivity in the area of interest;

(c) forming a graphic display of the resistivity properties to indicate the regions of contrasting resistivity as locations of contaminating pollutants;

(d) computing from said second secondary magnetic field values measured by said horizontal coil of said second probe a spatially continuous, two-dimensional map indicative of said regions of contrasting resistivity in the area of interest; and (e) generating a spatially continuous, two-dimensional map indicative of said electrical resistivity properties of said earth formation in the area of interest for interpreting and verifying said spatially continuous, three-dimensional map.

15. The method of claim 14 wherein resistivity values are computed from secondary magnetic field values measured by said first probe and said second probe utilizing the average resistivity of earth formation in the area of interest.

16. The method of claim 15 wherein the values of said first secondary magnetic field and said graphic display of resistivity properties are determined subsequent to said step of measurement of said composite primary and first secondary magnetic fields as a function of depth in said borehole for all said transmitter coil locations.

17. The method of claim 16 wherein said resistivity values measured as a function of depth for each transmitter coil location are normalized to a reference depth prior to said step of forming a graphic display.

18. The method of claim 17, wherein two dimensional maps of resistivity are taken from said three-dimensional map for any plane of orientation.

19. The method of claim 17, wherein the volume of earth formation within predetermined resistivity ranges are calculated from said spatially continuous maps of formation resistivity.

20. The method of claim 19 wherein said values of secondary magnetic field are determined from the response of one receiver coil within said first probe.

21. The method of claim 20, wherein said axis of said receiver coil is parallel to the axis of said first probe.

22. The method of claim 19 wherein said values of secondary magnetic field are determined from the combined responses of two receiver coils within said first probe.

23. The method of claim 22, wherein said two receiver coils are longitudinally spaced within said first probe, with the axes of both said receiver coils being parallel to the axis of said first probe.

24. The method of claim 14 wherein said resistivity values measured by said second probe are converted to relative resistivity values for comparison to the resistivity values measured by said first probe.

25. An apparatus for locating pollutants contaminating earth formations as indicated by regions of contrasting resistivity of subsurface earth formations in an area of interest indicated in data obtained by making spatially continuous three-dimensional maps of resistivity of the subsurface earth formations, comprising;

(a) an essentially circular transmitter coil adapted to be positioned at multiple locations on the surface of the earth in the vicinity of a borehole for transmitting energy at a tuned frequency in a range between 100 and 1000 hertz to induce magnetic fields within the earth in the area of interest;

(b) means for supplying alternating current to said transmitter coil to cause transmission of the energy;

(c) an elongated first probe containing at least one receiver coil for measuring magnetic field data in the area of interest;

(d) means for conveying said first probe along said borehole;

(e) a second probe comprising a horizontal coil and a vertical coil for measuring magnetic field data in the area of interest;

(f) means for providing said second probe along the surface of the earth an offset distance from said transmitter location;

(g) means for providing power to said first probe and said second probe;

(h) a probe depth indicating unit cooperating with said means of conveying said first probe along said borehole;

(i) means for transmitting magnetic field data measured by said at least one receiver coil in said first probe to the surface of the earth;

(j) means for transmitting magnetic field data measured by said horizontal and vertical coils of said second probe;

(k) means for processing magnetic field data from said first and second probes to obtain measures of resistivity of earth formation in the area of interest, said processing means including:
  (1) means for correlating magnetic field data measured by said first probe with corresponding measures of depth of said first probe supplied by said probe depth measuring means;
  (2) means for separating the portion of magnetic field data measured by said first and second probes caused by localized resistivity anomalies in surrounding earth formations; and
  (3) means for converting said separated portion of said magnetic field data to corresponding resistivity values of localized resistivity anomalies indicative of locations of contaminating pollutants;

(l) means for generating a spatially continuous, three-dimensional map of said localized resistivity anomalies indicative of locations of contaminating pollutants in the area of interest from the resistivity values associated with said first probe;

(m) means for generating a spatially continuous, two-dimensional map of said localized resistivity and anomalies indicative of locations of contaminating pollutants in the area of interest from the resistivity values associated with said second probe for interpreting and verifying said spatially continuous, three-dimensional map.

26. The apparatus of claim 25, wherein said diameter of said essentially circular transmitter coil is between two feet and ten feet.

27. The apparatus of claim 25, wherein said first probe contains one receiver coil with the axis of the coil parallel to the axis of said elongated first probe.

28. The apparatus of claim 25, wherein said first probe contains two longitudinally spaced receiver coils with the axis of each coil parallel to the axis of said elongated probe.

29. The apparatus of claim 25, wherein said transmitter coil induces a magnetic field at each of said multiple spaced transmitter locations, said magnetic field being induced within the subsurface earth formations between said surface transmitter location and said first probe receiver in the borehole.

30. A method of measuring for pollutants contaminating surface earth formations located in an area of interest as indicated by regions of contrasting resistivity of the subsurface earth formations indicated in data obtained by making spatially continuous measurements of electrical properties of the earth formations for planning a subsequent measurement of pollutants contaminating subsurface earth formations located in the area of interest, comprising the steps of:

(a) positioning an electromagnetic transmitter at multiple spaced locations on the surface of the earth above the area of interest, and for each transmitter coil location performing the steps of:

(1) applying an alternating current to said transmitter, thereby inducing a primary magnetic field within the earth in the area of interest;

(2) generating a secondary magnetic field through the interaction of said primary field with any regions of contrasting electrical properties within the earth in the area of interest;

(3) providing a probe along the surface of the earth at a constant offset distance from said transmitter location, said probe comprising a vertical coil perpendicular to the surface of the earth and horizontal coil parallel to the surface of the earth;

(4) measuring with said vertical coil of said second probe said primary magnetic field;

(5) measuring with said horizontal coil of said second probe said secondary magnetic field;

(b) computing from said secondary magnetic field values measured by said horizontal coil of said second probe a spatially continuous, two dimensional map indicative of said regions of contrasting resistivity in the area of interest; and (c) generating a spatially continuous, two-dimensional map indicative of said electrical resistivity properties of said earth formation in the area of interest for planning a survey for the pollutants in the area of interest.

* * * * *